United States Patent Office 2,750,252
Patented June 12, 1956

2,750,252
METHOD OF APPLYING LINDANE

William N. Sullivan, Washington, D. C., and Frank H. Babers, Silver Spring, Md.; dedicated to the free use of the People in the territory of the United States No Drawing. Application June 26, 1951,
Serial No. 233,679

3 Claims. (Cl. 21—53)

(Granted under Title 35, U. S. Code (1952), sec. 266)

The invention herein described may be manufactured and used by or for the Government of the United States of America for governmental purposes throughout the world without the payment to us of any royalty thereon.

We hereby dedicate the invention herein described to the free use of the people in the territory of the United States to take effect on the granting of a patent to us.

This invention relates to a method and apparatus for dispersing at room temperatures materials having pesticidal properties but having very low vapor pressures.

The principle employed is to vastly increase the surface area of the slightly volatile pesticide exposed to the air by coating the material in finely divided form onto non-absorbing material, such as glass fibers, held in a container in such a way as to be freely permeable to air. A stream of air is then passed through the treated material. The current of air required to quickly distribute the pesticidal vapors throughout a room, warehouse, or barracks type structure is provided by an electric fan. By incorporating a treated surface into an air-conditioning system, airplanes, or other vehicles, and any type building with such systems can be quickly freed of insect life.

An object of this invention is to use as pesticides, for dispersal by this method, highly effective but only slightly volatile materials, such as the gamma isomer of 1,2,3,4,5,6-hexachlorocyclohexane, commonly called lindane, chlordane, aldrin, and possibly other slightly volatile materials like parathion that show promise as insecticides. The toxicity of these materials to insects has been well established. Their chronic toxicity to humans, except for parathion, is still a matter of controversy, but their use over long periods in inhabited buildings is not yet recommended. Parathion, of course, is extremely toxic to man and animals even in very low concentrations and cannot be used except under rigidly controlled conditions. The formulas of the principal ingredient of lindane, chlordane, aldrin, and parathion are well known, being:

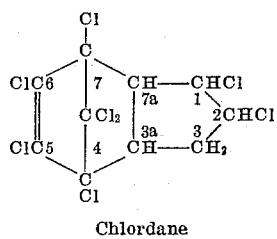

Chlordane

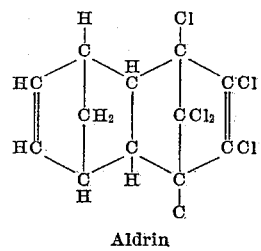

Aldrin

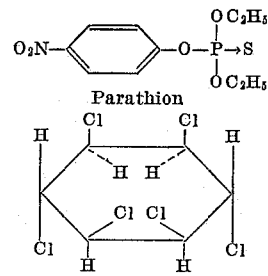

Parathion

Lindane (gamma isomer of hexachlorocyclohexane, 99% or higher purity)

The physiological processes in insects affected by these materials are not known. In any event, the physiological mode of action is not related to the manner by which the insecticide reaches its site of action in the insect. Thus, to state that a certain insecticide kills insects by fumigation, is from a pharmacological viewpoint erroneous. One can only say that the toxicant enters the insect body as a vapor. The advantages of using a material as a toxic vapor are obvious. By merely flying through a treated room, insects would receive a lethal dose of material, while if used as a contact poison, the insect would have to actually touch the treated surface, or the insect would have to eat treated food if the material was employed as a stomach poison.

For years insecticides have for practical purposes been classified as fumigants, stomach poisons, or contact poisons, depending on the way the poison is applied to the insect. Many insecticides are effective when applied in more than one way. DDT, for instance, is toxic to insects when used either as a stomach or contact poison but it is considered a poor fumigant. The insecticides currently in wide use as fumigants are usually gases at room temperature, or have very high vapor pressure and are, therefore, readily volatilized. Other materials, with very low vapor pressures, such as lindane, chlordane, aldrin, and parathion, have been considered effective as fumigants at room temperature only when used in small, enclosed areas. Their most effective use by far has been as stomach or contact poisons. That lindane vapors are toxic to many insects has been known since its introduction as an insecticide. The rate of evaporation may be increased by: (1) Increasing the volume of air passing over the material, (2) increasing the surface area of the material, (3) raising the temperature of the material, or (4) lowering the pressure by creating a vacuum, and (5) by a combination of these.

Lindane with a vapor pressure of $9.4 \times 10^{-6}$ mm. of mercury at 20° C., chlordane $4.14 \times 10^{-6}$, aldrin about $9 \times 10^{-6}$, and parathion $3.8 \times 10^{-5}$, in order to be effective as fumigants at room temperatures in other than very small containers, must be vaporized much more rapidly than is possible by simple diffusion.

It has been known for some time that vapors somewhat toxic to insects are obtained by blowing streams of air over cotton or sponges impregnated with pesticidal materials having a high vapor pressure, such as paradichlorobenzene or naphthalene. The vapor pressure of these compounds at 30° C. is 1.5 mm. mercury and 0.113 mm. mercury, respectively, or several thousand times that of the proposed materials. In addition to the high vapor pressure which caused rapid disappearance of the material, their low level of insecticidal activity required the use of up to 100 pounds of material per 1,000 cubic feet.

Methods to disperse lindane by the use of heat have been proposed and at least one patented, but in many instances the use of heat is precluded due to the hazards involved. Also, when heat is used, simple diffusion has been relied upon to disperse the vapors. Even under the most favorable conditions, a long time is required to build up an effective concentration, and ordinary leakage through crevices or open doors or windows may make it impossible to build up such concentrations without the use of an excessive number of units and amounts of material.

By the proposed method, for example, a filter unit constructed with glass fibers of the type used as an air filter in air-conditioning systems is impregnated with the pesticide. The filter is prepared by spraying the filter with a solution of the pesticide in a suitable volatile solvent such as acetone. The solvent then is allowed to evaporate, which occurs in a few hours. The size of the screen should be varied according to the area to be treated and size of the fan to be used. The treated screen is mounted on the guard of an ordinary electric fan or in the air stream of a circulating blower. Circulating fans with blade sizes between 6 and 16 inches, delivering between 100 and 10,000 cubic feet of air per minute, have proved satisfactory. The small size fan, together with a small screen, has proved adequate for rooms approximately 2,000 cubic feet capacity, while the larger sizes have proved effective in large buildings such as barns and warehouses. The flow of air through the screen may be increased up to 10 percent by enclosing the fan in a box-like container. At a flow of 100 cubic feet per minute, a screen treated with 100 grams lindane will theoretically require about 6,400 hours continuous operation to evaporate the lindane, while at 1,000 cubic feet per minute, 640 hours would be required at 20° C. Under normal operation, these theoretical figures would vary somewhat according to temperature variation and other factors.

For maximum efficiency, it is necessary that the particle size of the material applied to the screen be large enough to give long-lasting crystals, and at the same time small enough for rapid volatilization. There is also an optimum size of spray particles for proper penetration of the glass fibers to assure a uniform deposit of pesticidal crystals. The best results are obtained with sprays whose droplet size is approximately 50 microns mass median diameter and applied at presures greater than 50 pounds per square inch within 12 inches of the glass filtering unit. Such a procedure gives a coating of crystals between 50 and 100 microns in diameter. During the manufacture of the screen, to insure the filtering efficiency, the glass fibers have been treated with a light coating of a heavy oil. This oil aids in preventing the pesticide from flaking off. Further, the commercially available Fiberglas filters are so manufactured that the glass fibers are properly aligned to insure free passage of air, but at the same time create a turbulence that aids in the evaporation of the insecticide. The surface area of pesticides may also be increased by spraying them on other inert materials such as steel or copper wool or glass beads, but the results are generally less satisfactory.

The best results were obtained where the filaments were approximately 0.0045 inch in diameter and made up to give a porous mass weighing about 3 oz. for a 1 x 12 x 12 inch screen.

In actual practice, chemical analyses indicate that the concentration of lindane in a room in which a unit is operated quickly approaches saturation, which for lindane is about 0.00016 mg. per liter of air at 20° C. Insecticidal tests have shown that very short exposure periods are sufficient to kill many species of insects. Using a 16" x 25" x 1" screen treated with 15 to 100 grams lindane and mounted on a 10" to 16" fan (dependent on treated area size), a series of 12 tests was run in rooms varying from 1,150 to 8,500 cubic foot capacity. Flies and mosquitoes, both free flying and caged, were placed in the rooms and the unit operated for 10 minutes. From 74 to 100 percent of the insects received lethal doses of insecticide. Insects such as the grasshopper and Japanese beetle required somewhat longer exposure, while more resistant insects like roaches and flour beetles required 2 to 18 hours' exposure. In airplanes, one screen placed in the air-conditioning system and operated 20 minutes gave 100 percent kill of flies and mosquitoes.

In another series of tests the relative effectiveness of lindane, aldrin, and chlordane was compared against mosquitoes, flies, roaches, and flour beetles. While specific against certain insects, in general the relative order of effectiveness from most to least was aldrin, lindane, and chlordane.

We claim:

1. A method of reducing insect life in a ventilated room suitable for occupancy by human beings, employing the slightly volatile pesticide, lindane, and without heating the latter, comprising propelling a stream of air at room temperature over a mass of crystals of lindane ranging from about 50 to 100 microns in diameter confined and supported in the path of the air stream, the crystals being spaced sufficiently apart to permit effective sublimation and to permit the stream of air to pass uniformly and freely over the crystals in said mass over the entire area thereof presented to the stream, the air being delivered through the mass at a rate of at least about 100 cubic feet per minute, the rate being correlated with the size of the room to obtain a rapid approach to saturation of the air with lindane vapor, which is about 0.00016 mg. per liter of air at 20° C.

2. A method of reducing insect life in a ventilated room suitable for occupancy by human beings, employing the slightly volatile pesticide, lindane, and without heating the latter, comprising: propelling air over crystals of lindane, the crystals ranging from about 50 to 100 microns in diameter and being affixed to and supported upon the surface of individual filaments of an inert, non-absorbing, fibrous air filter mass, the air being at room temperature and passing freely between the filaments, the filaments repeatedly buffeting the air to create turbulence to aid in evaporation, the air being delivered through the mass at a rate of at least about 100 cubic feet of air per minute, the rate being correlated with the size of the room to obtain speedy approach to saturation of the air with lindane, which is about 0.00016 mg. per liter of air at 20° C.

3. A method of reducing insect life in a ventilated room suitable for occupancy by human beings, employing the slightly volatile pesticide lindane, without heating the latter, comprising propelling air over crystals of the lindane, the crystals ranging from about 50 to 100 microns in diameter and being supported upon the filaments of an air permeable, inert, non-absorbing, fibrous air filter mass, the air being propelled through said mass at a rate sufficient to quickly disperse sufficient vapors of the pesticide into the room to kill insect life, the air being at room temperature, and the air being delivered through the mass at a rate of at least 100 cubic feet of air per minute, being correlated with the size of the room to obtain speedy approach to saturation of the air with lindane.

References Cited in the file of this patent

UNITED STATES PATENTS

| | | |
|---|---|---|
| 1,521,872 | Dellinger | Jan. 6, 1925 |
| 1,717,470 | Speidel | June 18, 1929 |
| 1,955,171 | Burns | Apr. 17, 1934 |
| 2,087,436 | Kirby | July 20, 1937 |
| 2,136,170 | Luertzing | Nov. 8, 1938 |
| 2,171,400 | Lyon | Aug. 29, 1939 |
| 2,173,073 | Pierson | Sept. 12, 1939 |
| 2,430,861 | Carpenter et al. | Nov. 18, 1947 |
| 2,614,820 | Boydijieff | Oct. 21, 1952 |

FOREIGN PATENTS

| | | |
|---|---|---|
| 592,670 | Great Britain | Sept. 25, 1947 |
| 586,647 | Great Britain | Mar. 26, 1947 |

OTHER REFERENCES

Jour. of Eco. Ento. for August 1950, pages 542–546.

Jour. of Eco. Ento. for June 1949, pages 436–438.